Fig. 1.

March 11, 1958  H. JAGGER  2,826,140
INKING RIBBON MEANS FOR CHECKWRITER
Filed June 27, 1955  7 Sheets-Sheet 3

Fig. 3.

INVENTOR.
Hubert Jagger
BY
Brown, Jackson, Boettcher & Dienner.
Attys.

March 11, 1958 H. JAGGER 2,826,140
INKING RIBBON MEANS FOR CHECKWRITER
Filed June 27, 1955 7 Sheets-Sheet 4

INVENTOR.
Hubert Jagger
BY
Brown, Jackson, Boettcher & Dienner
Attys.

March 11, 1958 H. JAGGER 2,826,140
INKING RIBBON MEANS FOR CHECKWRITER
Filed June 27, 1955 7 Sheets-Sheet 7

INVENTOR.
Hubert Jagger
BY
Brown, Jackson, Boettcher & Dienner,
Attys.

United States Patent Office 2,826,140
Patented Mar. 11, 1958

2,826,140

INKING RIBBON MEANS FOR CHECKWRITER

Hubert Jagger, Maywood, Ill., assignor to Theodore B. Hirschberg, Jr., Chicago, Ill.

Application June 27, 1955, Serial No. 518,161

9 Claims. (Cl. 101—96)

This invention relates to machines for printing or writing checks and like instruments, commonly termed checkwriters, and has to do with inking ribbon means for such machines.

Checkwriters employing independently adjustable printing segments and cooperating platen means for effecting the printing operation are well known and extensively used. In such machines the operation of inking the printing segments is usually effected by means of an inking roller moved across the printing surfaces of the characters of the segments. It is known to provide rather complicated means for moving the inking roller across the printing surfaces of the segments and returning it to its normal inoperative position during the printing operation. Also the inking roller requires re-inking thereof and unless the re-inking is done properly the characters to be used in the printing operation may not be uniformly inked and unsatisfactory results in the printing of the check may be incurred.

My invention is directed to inking ribbon means whereby in the printing operation the check or other paper to be printed is subjected, at the printing area thereof, to pressure in contact with an inking ribbon so that uniform inking of the printed characters is assured. A further advantage of using an inking ribbon is that a two colored ribbon may be used whereby two adjacent portions of the check may be printed in different colors. My invention is directed to inking ribbon means of simple construction and operation and in which a new area of the ribbon is presented to the printing characters at each printing operation. In the inking ribbon means of my invention the inking ribbon is mounted on two spools and passes therebetween beneath and adjacent the printing segments of the machine so as to be moved into pressure contact with the printing characters by the check or other paper being printed, during the printing operation. Preferably the two spools for the ribbon are located in front of and in back of the printing line of the machine and means is provided for turning one of the spools incident to the printing operation so as to wind the ribbon thereon. The means for turning one of the spools is reversible so that the spools are turned in alternate relation for winding the ribbon from one spool onto the other spool and then winding the ribbon from the first spool thus reversing the travel of the ribbon after it has been unwound from either spool. The spool operating means is automatically reversed when the ribbon has been wound off of one spool onto the other spool, such reversal being controlled by the tension of the ribbon, which provides simple automatic means for reversing the direction of travel or feed of the ribbon after it has been wound off of one spool onto the other spool. Further objects and advantages of my invention will appear from the detail description.

The checkwriting machine of my invention is in general, except as to the inking ribbon means, similar to the checkwriter disclosed in Patent No. 1,909,141, issued May 16, 1933, to Arthur H. Woodward and William E. Richmond, and the checkwriter disclosed in Patent No. 2,118,871, issued May 31, 1938, to Ernest H. Thompson, and a brief description of the general construction and operation of the machine will suffice.

The main frame of the machine comprises side plates 1 and 2 of irregular polygonal shape, each of these plates being provided with a forwardly extending base element 3 which defines, with the body portion of the plate, a rearwardly extending slot 4 for the insertion of the check or like paper into the machine. The plates 1 and 2 are secured together in spaced relation by spacing rods 5 suitably secured therethrough.

A shaft 6 is suitably mounted in the plates 1 and 2 and extends through a sleeve 7 at the upper end of a "cents" bar 8 secured at its lower end to a guide bar 12 which extends transversely of the main frame and has its end portions suitably secured in the plates 1 and 2. In practice there are two other bars—a "sum" bar and a "dollars" bar having sleeves at their upper ends receiving the shaft 6 and secured at their lower ends to the guide bar 12. The printing line of the machine is the line defined by the bar 8 and the other two bars aligned therewith transversely of the machine, and the segments which carry the printing characters are individually adjusted to align such characters on this printing line. The bar 8 bears upon its lower or printing face the abbreviation "cts" for cents and the dollars bar (not shown) bears upon its lower or printing face the abbreviation "dol's" for dollars. The "sum" bar (Figures 3 and 5) is disposed adjacent the inner face of the right hand side plate 1 and is of T-cross section at its lower end for reception of a prefix plate 10 of channel cross section slidable thereon. The plate 10 may bear a suitable legend upon the printing face thereof, such as "The sum." Suitable means, with which we are not here concerned, is provided for actuating the prefix plate 10.

A plurality of type segments 15 (Figure 1) are mounted on shaft 6 for turning movement thereon, these segments being suitably spaced apart upon shaft 6. An arcuate type bar 16 is suitably secured to the edge portion of each segment 15 for movement therewith. The type bar 16 is provided, upon its printing face, with a series of characters ranging from "0" to "9" and arranged in seriatim order, there being a spacing character such as asterisks or star, preceding the zero or naught character. The guide bar 12 is provided with a plurality of guide slots 17 extending from front to back thereof, this bar being of approximately L-shape in cross section. The guide slots 17 receive the type bars 16 of the respective segments 15 so as to guide the latter in the movement thereof and hold them against lateral movement. In that connection, it will be noted that the forward edge of the guide bar is disposed adjacent the printing line of the machine, the characters which are used for printing in a given printing operation being those which are disposed in alignment immediately in front of the forward edge of the guide bar. That is advantageous as assuring that the type characters used in the printing operation are effectively held against any objectionable looseness or play during the printing operation, thus assuring accuracy.

Each segment 15 is provided with a forwardly projecting finger 20 riveted or otherwise suitably secured thereto and suitably shaped and disposed to project through a slot in an index plate 21 suitably secured over an opening provided in a housing or casing 22 mounted on the machine in a suitable manner. A number strip 23 is suitably secured to finger 20 at the underface of index plate 21. The finger 20 is provided at its outer end with a finger grip 24 fitting thereon with a tight friction fit so as to be removable if required. The strip 23 is disposed concentrically with the shaft 6 and is marked correspondingly to the arrangement of the characters upon the type bar 16. The index plate is provided, adjacent each slot thereof, with a series of characters corresponding to the characters of the type bar 16, but arranged oppositely thereto, and is further provided, adjacent each slot, with an opening for observation of the strip 23 which is disposed to move beneath such opening; as in the above identified patents. The strips 23 are so disposed that the number or character visible through the opening corresponds to the character of the associated type bar 16 which is disposed upon the printing line of the machine. Also, the grip member 24 is so disposed as to be aligned with that character of the series of characters adjacent that slot of the index plate which corresponds to the character of the type bar which is in position upon the printing line, as in the above mentioned patents. That provides simple and efficient means for accurately determining the set of the respective printing or type segments.

Figure 1:
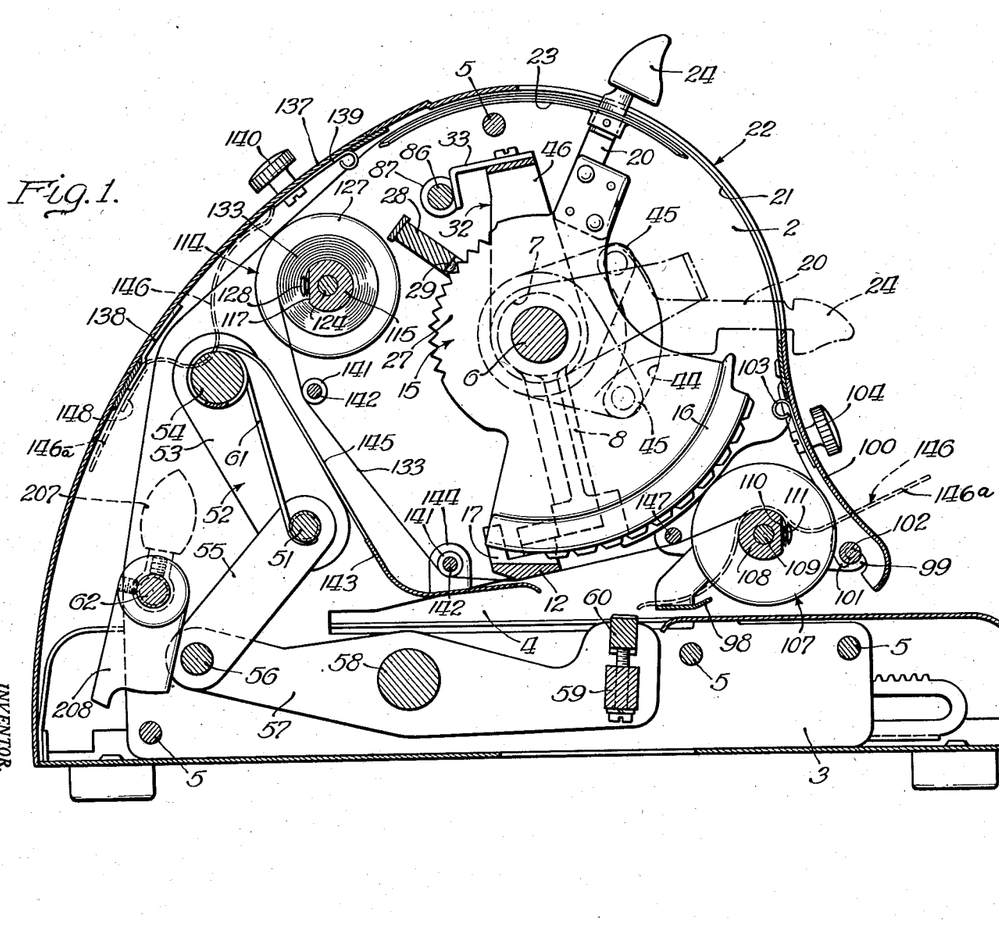
Figure 1 is a vertical sectional view taken from front to back and adjacent the right hand side of a checkwriter provided with inking ribbon means embodying my invention.

The printing segments 15, being loose upon the shaft 6, are independently adjustable on a common axis for selectively aligning the printing characters of the type bars 16 on the printing line of the machine, this independent adjustment of the segments being accomplished by direct movement thereof through the manual operation of member or finger 20. Each segment 15 is provided with a two way rack 27 formed by cutting teeth in the hub portion of the segment. An index bar 28 (Figure 1) is suitably secured at its ends in the plates 1 and 2, this bar being disposed in rear of and above the shaft 6. Bar 28 is suitably bored from its lower and forward edge for reception of detent balls 29, one of which is shown in Figure 1, which are spring pressed for engagement with the rack 27. The bar 28 is slotted for reception of the racks 27 of the respective segments 15 and the ball detent 29 engages between adjacent teeth of the rack and provides therewith means for yieldingly holding the respective segments 15 in adjustment.

Upon completion of a printing operation all of the segments 15 should be returned to normal position. For that purpose I provide a clearing yoke 32 of inverted U-shape, the arms of which are mounted for turning movement upon the shaft 6. The yoke 32 is yieldingly urged in counterclockwise direction, as viewed in Figure 1, by means to be described presently, and has secured to its bight portion an angle finger 33 which contacts a cross rod 86, to be later referred to, so as to limit rearward swinging movement of yoke 32 and normally hold it in its position shown in Figure 1. By swinging the yoke 32 forwardly and downwardly, after a printing operation, all of the segments 15 are returned to normal or inoperative positions. Movement of segments 15 in a counterclockwise direction, as viewed in Figure 1, is limited by contact of the fingers 20 with yoke 32.

Figure 2:
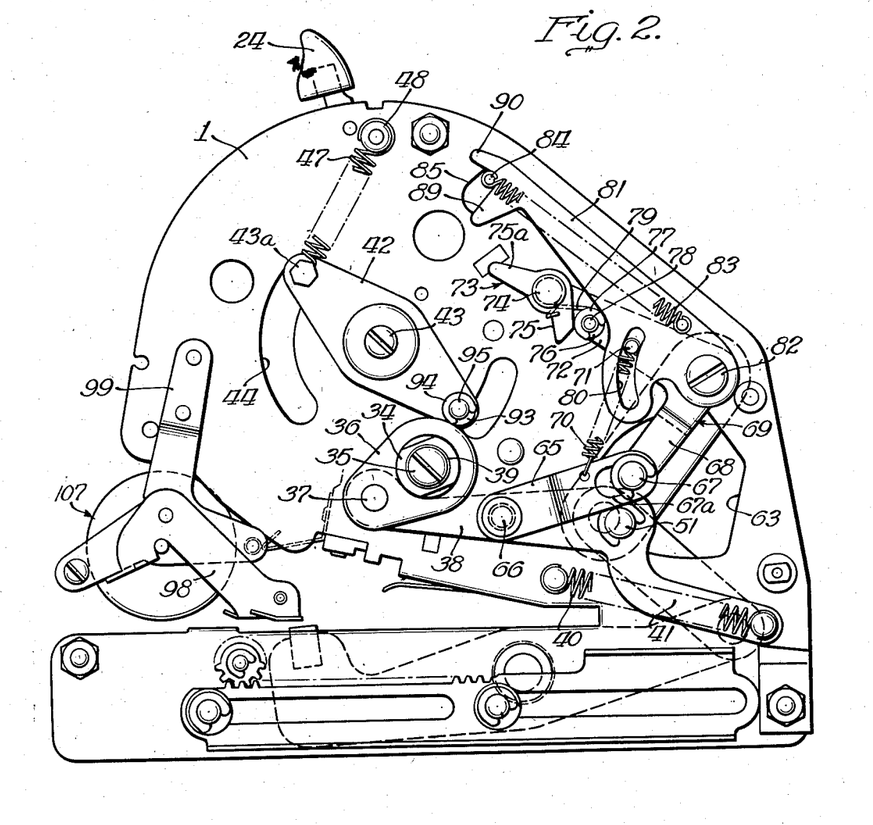
Figure 2 is a right hand side view, on a reduced scale, of the checkwriter of Figure 1, with the enclosing casing omitted.

A short sleeve or bushing 34 (Figure 2) is mounted for turning movement on a stud (not shown) secured to and projecting outward from the right hand side frame 2 a short distance above the lower edge thereof. Bushing 34 is confined between side plate 2 and the head of a screw 35, as shown in Figure 2, threading into the stud secured to plate 2. At its inner end the bushing 34 has secured thereto a crank arm 36 pivoted at its outer end, at 37, to the forward end of a toggle operating link 38 disposed at the inner face of arm 36 and confined between the latter and plate 2. The outer end of bushing 34 is slabbed off from opposite sides, to provide flats thereon and receives the lower end portion of an operating lever (not shown) fitting tightly on the outer end of the bushing, which is provided with a reduced cylindrical extension or neck 39 which is exteriorly threaded for reception of a nut for securing the operating lever in position. Normally, the crank arm 36 is in its full line position shown in Figure 2, being held in such position by a tension spring 40 anchored to side plate 2 at its forward end and anchored at its rearward end to the rearward end of a downwardly offset rearward extension 41 of link 38. A clearing yoke operating lever 42 is pivoted at its midlength at 43 on the outer face of side plate 2 above the bushing 34. At its upper forward end the lever 42 is connected by a pin 43a passing through an arcuate slot 44 in plate 2 to the radially outer or forward end of an arm 45 (Figure 1) fixed to the adjacent arm 46 of yoke 32. A tension spring 47 is anchored at its lower end to pin 43a and is anchored at its upper end to a post 48 fixed to side plate 42. Spring 47 normally holds lever 42 in its position shown in Figure 2 and is effective for normally holding the clearing yoke 32 in its full line position shown in Figure 1 and for returning it to that position after a clearing operation.

Link 38 is pivoted, at its juncture with extension 41 thereof, on pintle 51 of a toggle link structure 52 shown in Figure 1. The toggle link structure includes two upper links 53 fixed at their upper ends on a cross shaft 54 rotatably mounted in the side plates 1 and 2. The lower ends of links 53 are pivoted, by pintle 51, to the upper ends of two lower links 55 pivoted at their lower ends on a rod 56 connecting the rearward ends of two platen supporting arms 57, one of which is shown in Figure 1, rockably mounted on a cross shaft 58 mounted in the side plates 1 and 2, the platen supporting arms 57 being mounted adjacent the inner faces of the side plates. A platen supporting bar 59 is secured in the forward ends of the arms 57 and carries a platen 60 adjustably mounted thereon in a known manner. The upper face of the platen 60 is serrated and cooperates with the printing characters disposed upon the printing line of the machine, which characters are also serrated. A torsion spring 61 is mounted on shaft 54 with one arm hooked about pintle 51 and the other arm (not shown) hooked about a cross shaft 62 rockably mounted in the side plates 1 and 2 adjacent the rear thereof. The torsion spring 61 assists in breaking the toggle and normally holding it in its inoperative position shown in Figure 1. In effecting the printing operation, the bushing 39 is turned in counterclockwise direction, as viewed in Figure 2, thus forcing the link 38 rearward in opposition to the tension spring 40. As previously noted, the pintle 51 extends through the link 38, plate 2 being provided with an opening 63 of adequate size to accommodate the movements of pintle 51. When the link 38 is forced rearward the toggle is straightened or extended and the platen 60 is moved upward into cooperating relation with the characters on the printing line of the machine. Upon completion of the printing operation the operating lever (not shown) is released and returned to its normal rearward position, tension spring 40 then returning the link 38 to its normal forward position and the parts assume their normal positions shown in Figures 1 and 2.

Referring further to Figure 2, a link 65 is pivoted at its forward end, at 66, to link 38 at about the mid-length thereof. The upper end of link 65 has pin and slot connection 67a—67 to the lower end of the lower arm 68 of a bell crank 69 mounted for turning movement on the reduced end of cross shaft 54. A tension spring 70 is anchored at its lower end to link 65 and at its upper end to a pin 71 secured to the upper arm 72 of bell crank 69. Tension spring 70 normally holds pin 67 at the rearward end of the slot 67a of link 65 providing, in conjunction with pin 67 the pin and slot connection above mentioned. A trip pawl 73 is pivoted, at 74, on the forward end of arm 72 of the bell crank 69. The rearward arm 75 of pawl 73 normally is held in contact with a stop collar 76 retained by a snap ring 77 on a stud 78 fixed to arm 72. A wire spring 79 is wound about the hub of pawl 73 with one arm bearing on stop collar 76 and its other arm engaging the lower edge of arm 75 of pawl 73 for normally holding arm 75 in contact with the stop collar 76. The pin 71 extends through an arcuate slot 80 in a downward extension of an arm 81 pivoted on the reduced end of cross shaft 54 at the outer face of the bell crank 69, bell crank 69 and arm 81 being confined between side plate 2 and the head of a screw 82 threaded into the end of shaft 54.

A tension spring 83 is anchored at its lower end to arm 81 at the lower portion thereof, above the screw 82, and is anchored at its upper end to a pin 84 carried by a crank arm 85 fixed on one end of rod 86 which is rockably mounted in the side plates 1 and 2. Rod 86 is restrained against endwise movement by stop collars 87 secured thereon adjacent the inner faces of side plates 1 and 2 and has a knob 88 (Figure 5) secured on its other end. Normally the rod 86 is turned approximately 90° from its position shown in Figure 2, with pin 84 contacting the downwardly extending finger 89 of arm 81. When the shaft or rod 86 is turned from its normal position to its position of Figure 2, pin 84 contacts finger 90 extending forwardly from the upper portion of arm 81 and raises the latter to its position shown in Figure 2.

When the arm 81 is in its normal lowered position the arm 81 occupies a position substantially lower than that shown in Figure 2. When the link 38 is moved rearward in a printing operation in the manner above described, the bell crank 69 is turned in counterclockwise direction, as viewed in Figure 2, to such an extent that the forward arm 75a of pawl 73 contacts roller 93 retained by snap ring 94 on a stud 95 at the lower rearward end of the clearing yoke lever 42. As the printing operation is completed, pawl 73 snaps over the roller 93 with arm 75a disposed therebeneath. In the return movement of link 38 the bell crank 69 is turned in clockwise direction and pawl 73 turns lever 42 counterclockwise, by engagement of arm 75a with roller 93, in opposition to tension spring 47, thus swinging the clearing yoke 46 downwardly and forwardly for effecting a clearing operation in the manner previously described. Thereafter arm 75a of pawl 73 passes beyond roller 93 and the parts are returned to normal positions. When the arm 81 is in its raised position shown in Figure 2, contact of pin 71 with arm 81 at the lower end of slot 80 limits downward movement of the upper arm 72 of bell crank 69 sufficiently to prevent passage of arm or finger 75a of pawl 73 beneath the roller 93. Accordingly a clearing operation will not be performed incident to a printing operation and any desired number of checks for the same amount may be printed without necessity for resetting the printing segments. The arm 81 and associated parts thus provide simple and efficient repeat means whereby any desired number of checks for the same amount may be printed without resetting the machine.

The machine is provided with adjustable check stops (not shown) for limiting the extent of insertion of the check into the machine, as is known. I also provide a printing line indicator 98 of suitable known type pivoted on multiple armed brackets 99 suitably secured, conveniently by riveting, to the forward portions of the side frame plates 1 and 2. Door 100 is mounted at the front of casing 22 by means of hook elements 101 engaging in circumferential grooves in a front cross shaft 102 extending between the forward arms of brackets 99, and a latch 103 engageable with the edge of the main portion of casing 22 and attached to an operating knob 104.

A front spool 107 is disposed at the front of the machine in underlying relation to the door 100. The spool 107 has a tubular spindle 108 which is secured on a cross shaft 109 rotatably mounted in the brackets 99. The spindle 108 is slabbed off to provide a flat 110 and has secured therein two headed studs, one of which is shown at 111, the heads of which are spaced from flat 110 in overlying relation thereto. A ratchet wheel 112 is secured to the head of spool 107 adjacent the left hand side plate 2, for a purpose which will appear more fully later. Suitable means such as a spring washer (not shown) may be provided for impressing a slight drag on spool 107 sufficient to prevent overrunning thereof when the ribbon is being unwound from the spool, as will appear more fully presently.

Figure 3:
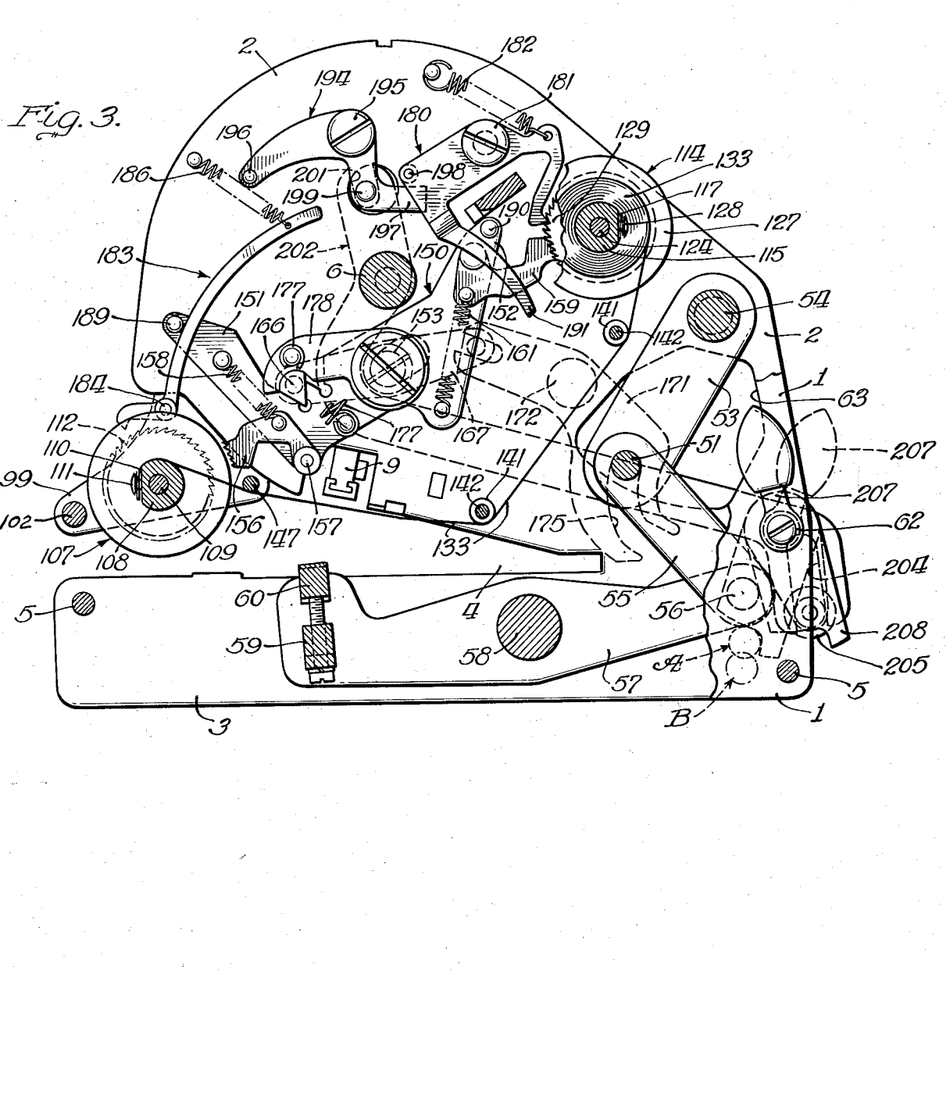
Figure 3 is a vertical sectional view from front to back of the machine of Figure 2, taken adjacent the inner face of the left side frame plate, the right hand side frame plate being shown fragmentarily and the means for operating the ribbon spools being shown as adjusted for imparting intermittent rotation to the rearward spool.
Figure 10:
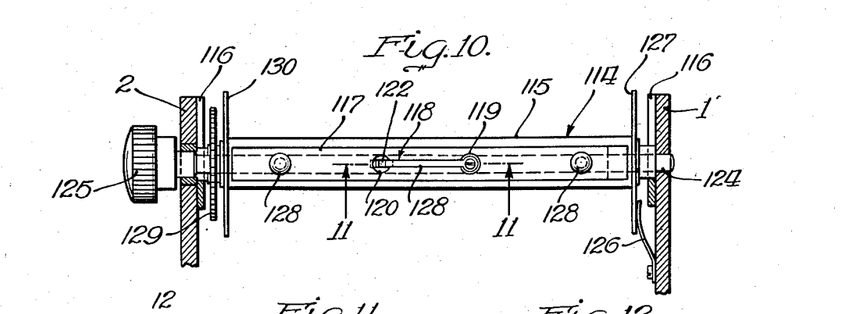
Figure 10 is a sectional view taken substantially on line 10—10 of Figure 5, the spool and associated parts being shown in plan view.
Figures 11, 12:
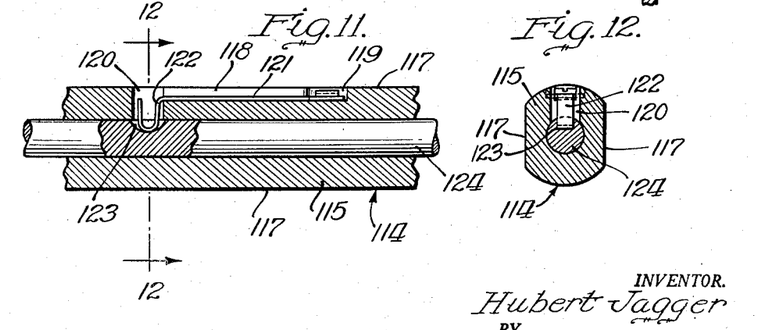
Figure 11 is a sectional view, on an enlarged scale, taken substantially on line 11—11 of Figure 10, certain parts being shown in elevation.
Figure 12 is a sectional view taken substantially on line 12—12 of Figure 11, the latch spring being shown in elevation.

A rear spool 114 is mounted between the side plates 1 and 2 in back of and above the printing segment shaft 6, as shown more clearly in Figures 1 and 3. Spool 114 comprises a tubular spindle 115 the end portions of which extend into substantially U-shaped guides 116 (Figures 4 and 10) secured to the inner faces of the side plates 1 and 2. The spindle 115 is slabbed off at one side to provide a flat 117 having a lengthwise groove 118 opening at one end into a cylindrical recess 119 and at its other end into a bore 120 extending radially inward to the bore of spindle 115. A latch leaf spring 121 is secured at one end to spindle 115, in the recess 119, and is provided at its other end with a U-shaped latch element 122 (Figures 11 and 12) extending through bore 120. Latch element 122 engages into a recess 123 in a shaft 124 inserted through spindle 117 and rotatably mounted in the side plates 1 and 2. A knob 125 is secured upon one end of shaft 124, adjacent the left hand side plate 2, for manually turning the spool 114 when desired to take up slack in the ribbon. A leaf spring 126 is secured to the side plate 1 and bears against the adjacent head 127 of spool 114 with appreciable pressure effective for preventing overrunning of the spool when unwinding the ribbon therefrom. It will be seen that the leaf spring 121 and associated elements provide means for detachably securing the spool 114 to shaft 124 for rotation therewith and that shaft 124 may readily be withdrawn to permit removal of the spool when required; and as readily reinserted and latched to spool 114. Two headed studs 128 are secured to spindle 115 of spool 114 with their heads spaced from and overlying the flat 117, and a ratchet wheel 129 is secured to spindle 115 adjacent the outer face of the other head 130.

Figures 7, 13:
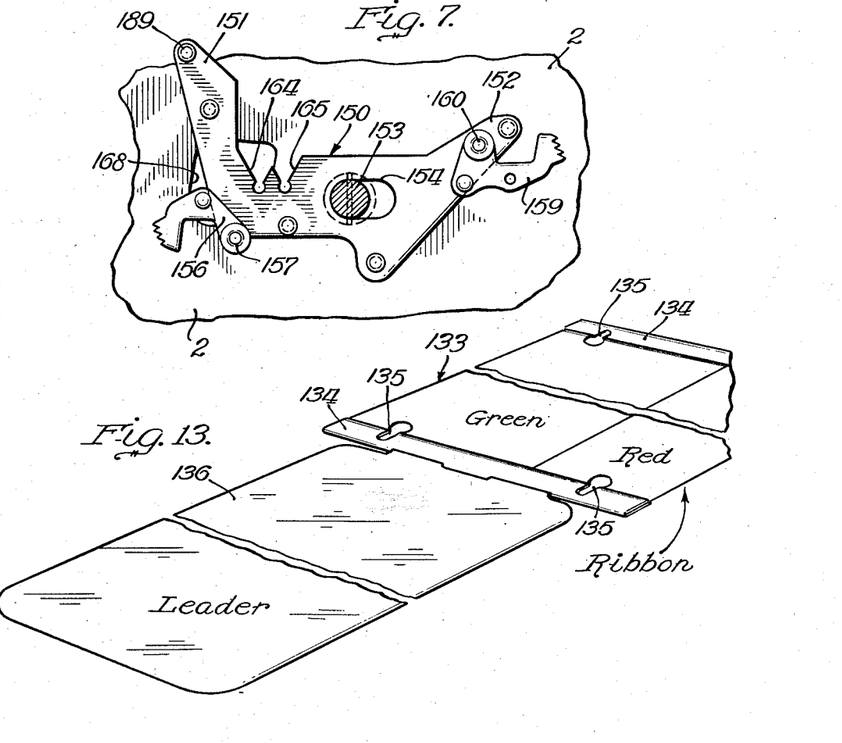
Figure 7 is a fragmentary inner face view of the left hand frame plate showing the parts shown in Figure 6.
Figure 13 is a perspective detail view, on an enlarged scale, of the inking ribbon and the leader attached thereto, parts being broken away.
Figure 14:
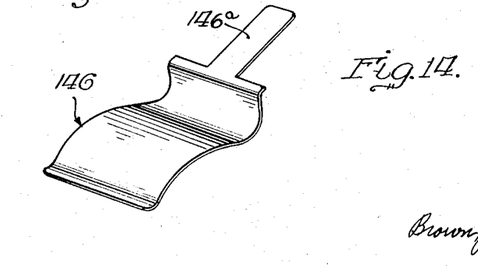
Figure 14 is a perspective view of the removable front guide for threading the inking ribbon through the machine.

Inking ribbon 133 is windable onto and off of the spools 107 and 114. A metal binder 134 is folded over and clamped upon each end of the ribbon 133, as shown in Figure 13, the binder and the adjacent portion of the ribbon being provided with bayonet slots 135. A leader 136 of waxed paper or other suitable material is attached to one end of the ribbon 133 with the corresponding binder 134. The leader is used in threading the ribbon 133 through the machine from one spool to the other, as will be understood. In practice, the ribbon is wound upon the rear spool 114 which underlies an opening in the casing 122 normally closed by a cover 137 having at its lower edge members 138 engaging the adjacent edge portion of casing 22 and at its upper edge latch 139 attached to a knob 140 and engageable with the adjacent edge portion of casing 22. The ribbon 133 is attached to spindle 115 of spool 114 by means of the binder 134 and bayonet slots 135 at the other end thereof from leader 136, in cooperation with the headed studs 128, as will be understood. Thereafter the ribbon is wound upon spool 114 and this spool is then placed in the machine and the ribbon is led from spool 114 to the front spool 107, to which the leading end of the ribbon is attached by means of the bayonet slots and leader 134 at that end of the ribbon in cooperation with the headed studs 111. Preferably the ribbon 133 is divided into two transverse areas containing different colors of ink, such as red and green, as indicated in Figure 13, the red area corresponding in width to the "cents" area of the check and the green area of the ribbon corresponding in width to the "dollars" area of the check. The ribbon 133 is led downward from spool 114 in back of and beneath rollers 141 mounted for free turning movement on cross rods 142 extending between and mounted in side frame plates 1 and 2, as shown in Figure 1. The lower guide 143, conveniently formed of sheet metal, is supported by ears 144 at the sides thereof from the lower cross rod 142. Guide 143 is provided with an upwardly and rearwardly extending neck 145 the upper end of which rests upon the convolutions of the torsion spring 61 on shaft 54. The guide 143 directs the leader 136 of ribbon 133 downward and forward beneath the guide bar 12 for threading the ribbon through the machine, as will be understood. To further assist in threading the ribbon through the machine, I provide a removable guide member 146 shaped as shown in Figure 14. In use the guide member 146 is disposed as indicated in broken lines in Figure 1 and serves to direct the leader 136 upward over spindle 108 of spool 107 and beneath a rear cross rod 147 extending between the brackets 99. The leading edge of the ribbon is attached to the spool 107 in the manner previously described, after which the leader 136 may be torn off and discarded. It will be seen that the ribbon 133 passes beneath the guide bar 12 and thence beneath the cross bar 147 in proximity to the type characters on the printing line of the machine. The guide 146 when not in use may conveniently be stored by insertion of the relatively narrow handle 146a thereof in a loop or strap 148 secured to the inner face of the casing 22 adjacent the lower edge of the opening in the top thereof normally closed by the cover 137, as indicated in broken lines in Figure 1.

Figure 4:
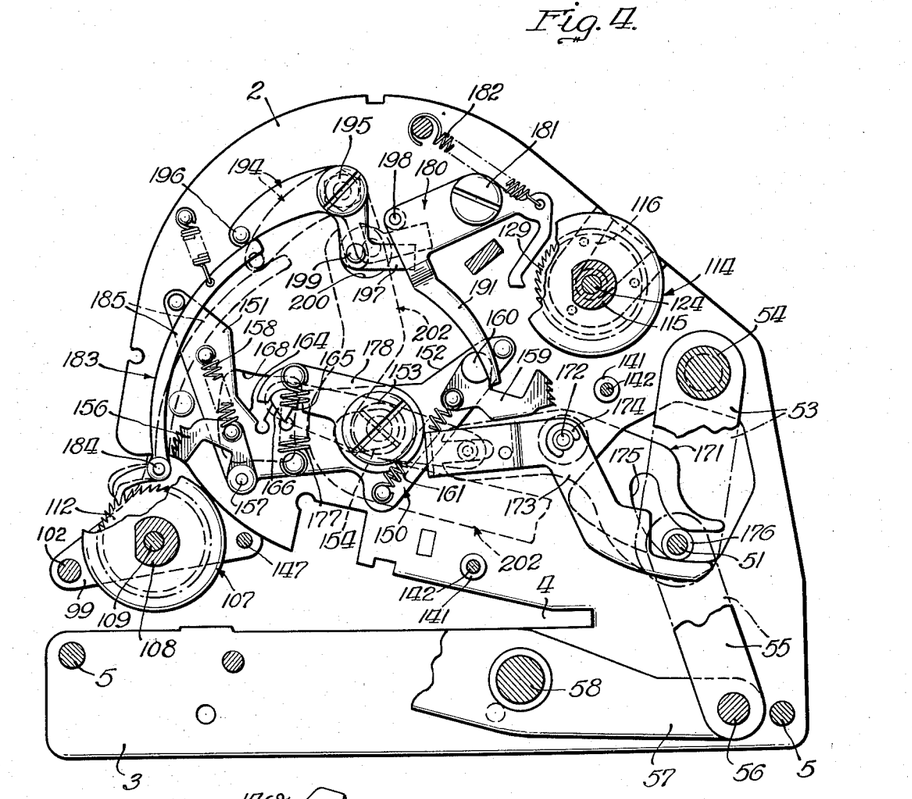
Figure 4 is a view similar to Figure 3 but omitting the fragmentary portion of the right hand frame plate and also omitting the ribbon, with the printing platen arms partly broken away and the toggle links also partly broken away.
Figure 5:
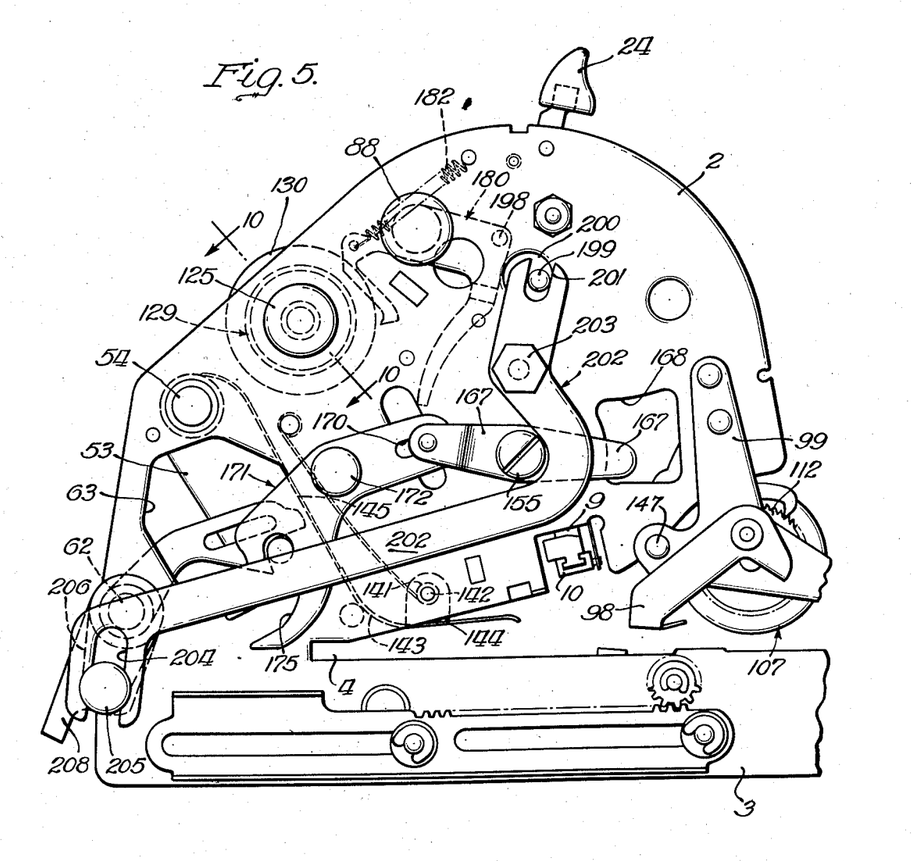
Figure 5 is an elevational view of the left side of the machine of Figure 1 with the casing omitted and the base of the machine and other parts partly broken away.
Figure 6:
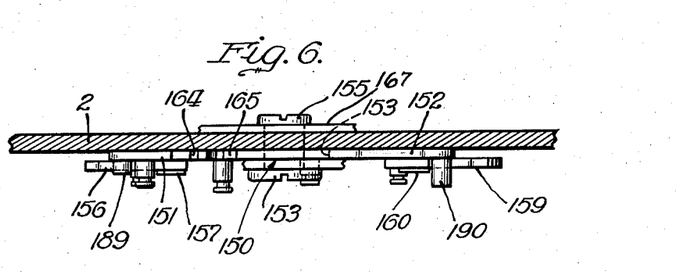
Figure 6 is a horizontal fragmentary sectional view, on an enlarged scale, taken through the upper portion of the left hand frame plate and showing the spool operating pawls and the mounting plate therefor.

A plate 150, shown more clearly in Figures 6 and 7, of generally rectangular shape with upwardly extending end fingers 151 and 152 is rockably and slidably mounted, at the inner face of the side frame plate 2, on a shouldered screw 153 received in a lengthwise slot 154 in plate 150. The screw 153 is coaxial with and secured to a shoulder screw 155 at the outer face of the side frame plate 2, as will be clear from Figures 5 and 6. A front feed pawl 156 is pivoted at its lower end, at 157, on the lower forward corner of plate 150 and is disposed to engage ratchet wheel 112 of the front spool 107, when the plate 150 is in its forward position, and to clear ratchet wheel 112 when plate 150 is in its rearward position shown in Figure 7. Pawl 156 is urged in clockwise direction by a tension spring 158 anchored at its lower end to pawl 156 and at its upper end to finger 151 of plate 150. A back pawl 159 is pivoted at 160 on finger 152 of plate 150 and is urged in clockwise direction by a tension spring 161 attached to pawl 159 and to plate 150 at the lower rearward portion thereof. In Figure 4 the plate 150 is shown in its inoperative position with the pawls 156 and 159 disposed to clear the ratchet wheels 112 and 129, respectively. When the plate 150 is in its forward operative position the pawl 156 engages ratchet wheel 112 for turning the front spool counter-clockwise, as viewed in Figure 4, pawl 159 being then disposed to clear ratchet wheel 129 of the rear spool 114, and when plate 150 is in its operative rearward position pawl 159 engages ratchet wheel 129 for turning spool 114 counterclockwise and pawl 156 is disposed to clear ratchet wheel 112; as will be explained more fully later.

Figure 8:
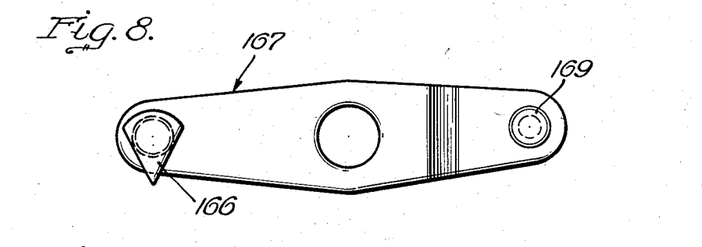
Figure 8 is an inner face view of the shifting and locking lever for the plate carrying the spool operating pawls and associated parts.
Figure 9:
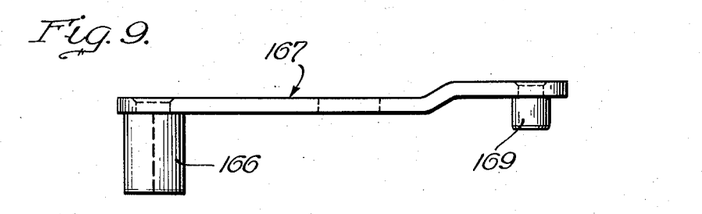
Figure 9 is a plan view of the lever of Figure 8.

Plate 150 is provided in its upper portion and adjacent finger 151 with two V-shaped notches 164 and 165 contiguous to each other. The notches 164 and 165 receive a V-shaped locking finger 166 extending from the forward end of the lever 167 (Figure 5 and Figures 8 and 9) pivoted at its midlength on the screw 155, finger 166 extending through an opening 168 in the side frame plate 2. At its other or rearward end lever 167 is provided with an inwardly extending stud or pin 169 which projects through a slot 170 at the forward end of an angle lever 171 (Figures 3, 4 and 5) pivoted at about its midlength, at the outer face of the side frame plate 2, on a headed stud 172. An angle latch lever 173 is pivoted on stud 172 at the inner face of the side frame plate 2 and is retained on the stud by a snap ring 174. The angle lever 173 is part of the mechanism for controlling the operation of the prefix bar 10, previously referred to, and need not be further considered here. The angle lever 171 is provided in its rearward portion with a cam slot 175 which receives a roller 176 mounted on the end of the pintle 51 of the toggle comprising the links 53 and 55. A latch arm 178 (Figures 3 and 4) is pivoted on the screw 153, at the inner face of plate 152 and normally engages over the lock finger 166 of lever 167 for holding it engaged in one of the notches 164 and 165. A tension spring 177 is anchored at its upper end to arm 178 and is anchored at its lower end to plate 150 adjacent the lower edge thereof. The tension spring 177 normally connects arm 178 and plate 150 together for movement as a unit upon the pivot screw 153.

A holding pawl 180, of generally rectangular shape, is pivoted on the inner face of side plate 2, on a shouldered pivot screw 181. The holding pawl is adapted for engagement with ratchet wheel 129 of the rear ribbon spool 114 during rotation of the latter in counterclockwise direction by the feed pawl 159, as will be explained more fully presently. A tension spring 182 anchored to frame side plate 2 and to pawl 180 urges the latter in counterclockwise direction for engagement with the ratchet wheel 129. A front holding pawl 183, pivoted at 184 on bracket 99 attached to side plate 2, is disposed for engagement with ratchet wheel 112 of the front spool 107 when the latter is rotated by the feed pawl 156, for preventing reverse rotation of spool 107. Pawl 183 is provided with an elongated arcuate arm 185 to which is attached the lower end of a tension spring 186 anchored at its upper end to the side plate 2. Spring 186 urges pawl 183 in counterclockwise direction for engagement with the ratchet wheel 112, as will be understood.

When the plate 150 is in its rearward operative position shown in Figure 3, the feed pawl 159 and the holding pawl 180 are in operative engagement with ratchet wheel 129 of the rear spool 114, lock finger 166 is engaged in the forward notch 164 of plate 150 restraining it against forward movement, the front feed pawl 156 is spaced rearward away from ratchet wheel 112 of the front spool 107 and the front holding pawl 183 is held clear of ratchet wheel 112 by engagement therewith of a release pin 189 carried by finger 151 of plate 150. With the parts in the positions shown in Figure 3, when the pintle 51 is moved rearward incident to a printing operation, the angle lever 171 is turned in counterclockwise direction, swinging the lever 167 in clockwise direction. The plate 150 and the parts carried thereby turns in clockwise direction with the lever 167 and the feed pawl 159 turns the rear spool 114 in counterclockwise direction until pawl 159 passes out of engagement with ratchet wheel 129 upon completion of the printing operation. In the return or forward movement of the pintle 51 the lever 167, and with it the plate 150, is turned in counterclockwise direction reengaging the pawl 159 with the ratchet wheel 129 for turning the spool 114 a further distance incident to a subsequent printing operation. In that manner, the rear spool 114 is rotated step by step in counterclockwise direction, as viewed in Figure 3, for winding thereon the ribbon 133 from the front spool 107, the latter being free to rotate, subject to a slight drag effective for preventing overrunning thereof during unwinding therefrom of the ribbon. When the ribbon has been completely unwound from the front spool 107, any further attempt to wind ribbon 133 onto the rear spool 114 places the ribbon under tension and it then becomes effective for preventing further rotation of spool 114 by the feed pawl 159. Accordingly, when the pintle 51 is again moved rearward the feed pawl 159 fulcrums on the ratchet wheel 129 and then constitutes with the plate 150 a toggle tending to force plate 150 forward over the pivot screw 153. Forward movement of plate 150 is resisted by engagement of the lock finger 166 in the forward notch 164 with the result that turning of lever 167 in clockwise direction, as viewed in Figure 3, raises finger 166 out of the notch 164. When that occurs, plate 150 moves to its forward operative position and is moved in clockwise direction about pivot screw 153 by tension spring 177, so as to cause finger 166 to engage in the inner notch 165 thus completing the forward movement of plate 150 and locking it against rearward movement. The feed pawl 156 is then in engagement with ratchet wheel 112 of the front spool 107, and the front holding pawl 183 is then released, due to the upward movement of pin 189 with plate 150, and engages ratchet wheel 112 so as to prevent reverse rotation thereof. Thereafter in the operation of the machine the front spool 107 is rotated in counterclockwise direction step-by-step for winding thereon the ribbon 133 from the back spool 114, which is now released and free for rotation. In that connection, the forward movement of plate 150 to its forward operative position moves feed pawl 159 clear of ratchet wheel 129 and, in addition, pin 190 on finger 152 of plate 150 contacts the downwardly extending arm 191 of holding pawl 180 and swings the latter to releasing position clear of the ratchet wheel 129. When the ribbon 133 has been completely wound off of the rear spool 114 onto the front spool 107, the latter spool is held against rotation and the plate 150 is returned to its position shown in Figure 3, by the toggle action of feed pawl 156 and plate 150 in cooperation with entry of the lock finger 166 into notch 164 of plate 150. In that manner, the feed of the ribbon 133 is automatically reversed when it has been completely wound off of one spool onto the other spool, such reversal of feed being controlled by the ribbon itself.

In order to permit ready removal and replacement of the ribbon 133, I provide means whereby both of the spools 107 and 114 may be released for free rotation at the same time. A bell crank release lever 194 (Figures 3 and 4) is pivoted at the inner face of the side frame plate 2, on a shouldered screw 195. One arm of lever 194 is provided with a trip pin 196 disposed to contact the upper end of arm 185 of the front holding pawl 183 so as to turn the latter to its inoperative position indicated in broken lines in Figure 4 when release lever 194 is turned from its full line position to its broken line position. The other arm of lever 194 is provided with an extension 197 disposed to contact a pin 198 carried by holding pawl 180 and to thereby move the latter to its position shown in Figure 4 or hold it in that position if it has previously been moved thereto. A pin 199, secured to the lower arm of release lever 194, projects through an opening 200 in side plate 2 and through a slot 201 in the upper end of a lever 202 pivoted at 203 on plate 2 at the outer face thereof and shaped as shown in Figure 5. Lever 202 is provided at its rearward end with a substantially vertical slot 204 which receives a headed pin 205 secured to a crank arm 206 secured on one end of cross shaft 62, at the outer face of side plate 2. An operating handle 207 (Figures 1 and 3) is secured on the other end of cross shaft 62 at the outer face of side plate 1. The shouldered arm or stop 208 is secured upon cross shaft 62 between the links 55 of the toggle. In order to release both of the spools, the pintle 51 is moved rearward as in a normal printing operation, until the cross rod 56 reaches the position indicated at A in Figure 3, which is somewhat above the position indicated at B, which it occupies at the end of the printing operation. The handle 207 is then turned from its full line position in Figure 3 to its broken line position, thus swinging the stop arm inward above cross rod 56 so as to hold it in its A position indicated in Figure 3. Turning of shaft 62 in clockwise direction, as viewed in Figure 3, swings lever 202 in clockwise direction, and turns the bell crank release lever counterclockwise from its position shown in Figures 3 and 4 in full lines, to its broken line position indicated in Figure 4. That assures that the holding pawls 183 and 180 are retained in positions clear of the ratchet wheels 112 and 129 of the spools 107 and 114, respectively, to permit free rotation thereof. In the movement of the cross rod 56 from its normal raised position to its position A, the plate 150 is turned in clockwise direction, as viewed in Figures 3 and 4, to a position approximately that shown in Figure 4, in which the feed pawls 156 and 159 clear the latchet wheels 112 and 129, respectively. The two spools 107 and 114 are then free for rotation. In order to replace the ribbon, it is wound off of spool 107 onto spool 114 until the end of the ribbon attached to spool 107 is exposed, at which time that end is detached from spool 107 and the remaining portion of the ribbon is wound onto spool 114. Shaft 124 is then withdrawn from spool 114 and, the cover 137 being removed, spool 114 with the ribbon wound thereon is lifted out of the machine. It may then readily be replaced by a new spool with a ribbon wound thereon, the ribbon being threaded through the machine and attached to the front spool 107, in the manner previously described. Thereafter the handle 207 is turned to its normal position shown in full lines in Figure 3, thus turning shaft 62 in counterclockwise direction so as to release cross rod 56 for return thereof to its normal upper position. Turning of shaft 62 causes turning of lever 202 in counterclockwise direction, as viewed in Figure 3, and turning of the bell crank release lever 194 in clockwise direction to its normal position shown in full lines in Figures 3 and 4. Thereafter the machine may be operated in the manner above described and the ribbon advanced step-by-step across the characters on the printing line of the machine, the direction of travel of the ribbon being automatically reversed under control of the ribbon itself, when the ribbon has been wound for approximately its full extent off of one spool onto the other spool.

It will be understood that changes in detail may be made without departing from the field and scope of my invention, and I intend to include all such variations, as fall within the scope of the appended claims, in this application in which the preferred form only of my invention has been disclosed.

I claim:

1. In a checkwriter having adjustable type positionable on a printing line and a cooperating platen, operating means for causing relative movement between said type and platen for performing a printing operation, a front inking ribbon spool in front of said printing line, a rear inking ribbon spool in rear of said printing line, an inking ribbon windable onto and off of said spools and passing between said type and platen, a plate slidably and rockably mounted between said spools having a forward operative position and a rearward operative position and rockable for rotating said spools, means for locking said plate in each of said positions and for releasing it and moving it to its other operative position responsive to winding of said ribbon to predetermined extent onto either of said spools, said last means comprising cooperating means on said plate and said spools for turning in ribbon winding direction the spool corresponding to the position of said plate incident to rocking of the latter, said plate being rockable to a third and neutral position rendering said spool turning means ineffective, means for rocking said plate to its said third position, and means for rocking said plate incident to a printing operation.

2. In a checkwriter having adjustable type positionable on a printing line and a cooperating platen, operating means for causing relative movement between said type and platen for performing a printing operation, a front inking ribbon spool in front of said printing line, a rear inking ribbon spool in rear of said printing line, ratchet wheels respectively secured to said spools, an inking ribbon windable onto and off of said spools and passing between said type and platen, a pawl plate rockably and slidably mounted between said spools having a forward operative position and a rearward operative position and rockable for rotating said spools, means for locking said plate in each of said positions and for releasing it and moving it to its other position responsive to winding of said ribbon to predetermined extent onto either of said spools, said last means comprising front and rear feed pawls pivoted on said plate and engageable with the ratchet wheel corresponding to the position of said plate for turning said spools in ribbon winding direction, said plate being rockable to a third and neutral position in which said pawls clear said ratchet wheels, means for rocking said plate to its said third position, and means for rocking said plate incident to performance of a printing operation.

3. In a checkwriter having adjustable type positionable on a printing line and a cooperative platen, operating means for causing relative movement between said type and platen for performing a printing operation, a front inking ribbon spool in front of said printing line, a rear inking ribbon spool in rear of said printing line, ratchet wheels respectively secured to said spools, an inking ribbon windable onto and off of said spools and passing between said type and platen, a pawl plate rockably and slidably mounted between said spools having a forward operative position and a rearward operative position, means for locking said plate in each of said positions, front and rear feed pawls pivoted on said plate and engageable with the ratchet wheel corresponding to the operative position of said plate during rocking thereof for turning said spools in ribbon winding direction, said pawls being disposed relative to said plate to provide therewith toggles effective for urging said plate from either operative position to its other operative position when the spool and ratchet wheel corresponding to the operative position of said plate are held against turning in ribbon winding direction, the ends of said ribbon being respectively attached to said spools whereby said ribbon restrains the spool on which it is being wound against turning movement when said ribbon has been substantially completely unwound from the other spool, means for rocking said plate incident to a printing operation, and means for releasing said locking means when said plate is rocked while said spools are restrained against turning, said locking means comprising supplementary means for urging said plate from either of its operative positions toward the other thereof.

4. In a checkwriter having adjustable type positionable on a printing line and a cooperating platen, operating means for causing relative movement between said type and platen for performing a printing operation, two inking ribbon spools, one of said spools being removable, an inking ribbon windable onto and off of said spools passing between said type and platen, winding means comprising ratchet wheels on said spools for rotating them alternately in ribbon winding direction incident to operation of said operating means, two holding pawls yieldingly urged toward and cooperatng with said ratchet wheels, said winding means comprising means for holding disengaged the pawl for the ratchet wheel of the spool from which the ribbon is being unwound while releasing for engagement the pawl for the ratchet wheel of the spool on which the ribbon is being wound, and means for optionally disabling said winding means and holding both of said pawls disengaged at the same time for free rotation of both of said spools in either direction.

5. In a checkwriter having adjustable type positionable on a printing line and a cooperating platen, operating means for causing relative movement between said type and platen for performing a printing operation, two inking ribbon spools, one of said spools being removable, an inking ribbon windable onto and off of said spools passing between said type and platen, winding means comprising ratchet wheels on said spools, a pawl plate between and shiftable toward and away from said spools into and out of cooperating relation thereto alternately, said plate being mounted for rocking movement, feed pawls on said plate disposed for engagement with an disengagement from said ratchet wheels alternately by shifting of said plate into and out of cooperating relation thereto, said plate having a neutral position in which both of said feed pawls are clear of both of said ratchet wheels, holding pawls yieldingly urged toward said ratchet wheels, said plate and pawls having cooperating means for holding disengaged the pawl for the ratchet wheel out of cooperating relation to said plate while releasing the other holding pawl, means for optionally holding said plate in its said neutral position, means for optionally moving both of said pawls to and holding them in disengaged position, and means for rocking said plate incident to performance of a printing operation.

6. In a checkwriter having adjustable type positionable on a printing line and a cooperating platen, operating means for causing relative movement between said type and platen for performing a printing operation, a front inking ribbon spool in front of said printing line, a rear inking ribbon spool in rear of said printing line, ratchet wheels respectively secured to said spools, an inking ribbon windable onto and off of said spools and passing between said type and platen, a pawl plate mounted between said spools on a slidable pivot for rocking movement about the axis thereof and for sliding movement to a forward operative position and a rearward operative position relative to said front and rear spools respectively, means for locking said plate in each of said positions, front and rear feed pawls pivoted on said plate and engageable with the ratchet wheel corresponding to the operative position of said plate during rocking thereof for turning said spools in ribbon winding direction, said pawls being disposed relative to said plate to provide therewith toggles effective for urging said plate from either operative position to its other operative position when the spool and ratchet wheel corresponding to the operative position of said plate are held against turning in ribbon winding direction, the ends of said ribbon being respectively attached to said spools whereby said ribbon restrains the spool on which it is being wound against turning movement when said ribbon has been substantially completely unwound from the other, spool, means for rocking said plate incident to a printing operation, and means for releasing said locking means when said plate is rocked while said spools are restrained against turning, said locking means comprising supplementary means for urging said plate from either of its operative positions toward the other thereof.

7. In a checkwriter having adjustable type positionable on a printing line and a cooperating platen, operating means for causing relative movement between said type and platen for performing a printing operation, a front inking ribbon spool in front of said printing line, a rear inking ribbon spool in rear of said printing line, ratchet wheels respectively secured to said spools, an inking ribbon windable onto and off of said spools and passing between said type and platen, a pawl plate rockably and slidably mounted between said spools having a forward operative position and a rearward operative position and rockable for rotating said spools, means for locking said plate in each of said positions and for releasing it and moving it to its other position responsive to winding of said ribbon to predetermined extent onto either of said spools, said last means comprising front and rear feed pawls pivoted on said plate and engageable with the ratchet wheel corresponding to the position of said plate for turning said spools in ribbon winding direction, said plate being rockable to a third and neutral position in which said pawls clear said ratchet wheels, means for rocking said plate to its said third position, front and rear holding pawls for said ratchet wheels, means carried by said plate effective for causing movement of said front and rear holding pawls respectively to operative and inoperative position responsive to movement of said plate to its forward and rearward operative positions, means for rocking said plate incident to a printing operation, and means for moving both of said holding pawls together to inoperative position.

8. In a checkwriter having adjustable type positionable on a printing line and a cooperating platen, operating means for causing relative movement between said type and platen for performing a printing operation, a front inking ribbon spool in front of said printing line, a rear inking ribbon spool in rear of said printing line, ratchet wheel respectively secured to said spools, an inking ribbon windable onto and off of said spools and passing between said type and platen, a pawl plate rockably and slidably mounted between said spools having a forward operative position and a rearward operative position and rockable for rotating said spools, means for locking said plate in each of said positions and for releasing it and moving it to its other position responsive to winding of said ribbon to predetermined extent onto either of said spools, said last means comprising front and rear feed pawls pivoted on said plate and engageable with the ratchet wheel corresponding to the position of said plate for turning said spools in ribbon winding direction, said plate being rockable to a third and neutral position in which said pawls clear said ratchet wheels, means for rocking said plate to its said third position, front and rear holding pawls for said ratchet wheels, means carried by said plate effective for causing movement of said front and rear holding pawls respectively to operative and inoperative position responsive to movement of said plate to its forward and rearward operative positions, means for rocking said plate incident to a printing operation, and means for moving both of said holding pawls together to inoperative position when said plate is in its said third position.

9. In a checkwriter having adjustable type positionable on a printing line and a cooperating platen, operating means for causing relative movement between said type and platen for performing a printing operation, a front inking ribbon spool in front of said printing line, a rear inking ribbon spool in rear of said printing line, ratchet wheels respectively secured to said spools, an inking ribbon windable onto and off of said spools and passing between said type and platen, a pawl plate rockably and slidably mounted between said spools having a forward operative position and a rearward operative position and rockable for rotating said spools, means for locking said plate in each of said positions and for releasing it and moving it to its other position responsive to winding of said ribbon to predetermined extent onto either of said spools, said last means comprising front and rear feed pawls pivoted on said plate and engageable with the ratchet wheel corresponding to the position of said plate for turning said spools in ribbon winding direction, said plate being rockable to a third and neutral position in which said pawls clear said ratchet wheels, means for rocking said plate to its said third position, front and rear holding pawls for said ratchet wheels, said holding pawls being mounted on stationary pivots independent of said plate and yieldingly urged into engagement with said ratchet wheels, abutment means on said plate disposed to move said holding pawls respectively out of engagement with said ratchet wheels and to release them for engagement with said ratchet wheels responsive to movement of said plate to its forward and rearward operative positions, means for rocking said plate incident to a printing operation, and means for moving both of said holding pawls together to inoperative position when said plate is in its said third position.

References Cited in the file of this patent

UNITED STATES PATENTS

| 1,084,656 | Myers | Jan. 20, 1914 |
| 1,766,626 | Glasgow | June 24, 1930 |
| 1,937,145 | Gollwitzer | Nov. 28, 1933 |
| 2,122,518 | Deane et al. | July 5, 1938 |
| 2,692,555 | Gruver | Oct. 26, 1954 |